(12) United States Patent
Wu

(10) Patent No.: US 9,706,445 B2
(45) Date of Patent: *Jul. 11, 2017

(54) METHOD OF HANDLING CALL IN HANDOVER IN WIRELESS COMMUNICATION SYSTEM AND WIRELESS COMMUNICATION DEVICE USING THE SAME

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 438 days.

This patent is subject to a terminal disclaimer.

(21) Appl. No.: 14/291,017

(22) Filed: May 30, 2014

(65) Prior Publication Data

US 2014/0269622 A1 Sep. 18, 2014

Related U.S. Application Data

(63) Continuation of application No. 12/776,436, filed on May 10, 2010, now Pat. No. 8,804,661.

(60) Provisional application No. 61/180,138, filed on May 21, 2009.

(51) Int. Cl.
*H04W 36/00* (2009.01)
*H04W 80/10* (2009.01)

(52) U.S. Cl.
CPC ........ *H04W 36/0022* (2013.01); *H04W 80/10* (2013.01)

(58) Field of Classification Search
CPC ....... H04W 48/02; H04W 4/22; H04W 8/245; H04W 76/007; H04W 48/18; H04W 48/16; H04W 76/02; H04L 65/1016; H04L 65/80; H04L 65/1069; H04N 7/147
See application file for complete search history.

(56) References Cited

U.S. PATENT DOCUMENTS

| | | | |
|---|---|---|---|
| 6,963,544 B1 * | 11/2005 | Balachandran | H04B 7/2612 370/281 |
| 8,068,501 B2 * | 11/2011 | Janakiraman | H04L 12/14 370/238.1 |
| 8,134,955 B2 * | 3/2012 | Rahman | H04W 36/0011 370/328 |

(Continued)

*Primary Examiner* — Jung-Jen Liu
(74) *Attorney, Agent, or Firm* — Jianq Chyun IP Office

(57) ABSTRACT

A method of handling at least a call in handover in a wireless communication system and a communication device using the same are proposed. The wireless communication system includes at least a wireless communication network and a wireless communication device. The method includes the following steps. First, a wireless communication device receives a message for switching at least a packet-switched (PS) call to at least a circuit-switched (CS) call from the wireless communication network. Further, the wireless communication device sets a stream identifier of each of the CS calls to an identifier value. The method enables smooth single radio voice call continuity (SRVCC) handover from the PS call in one wireless communication network to the CS call in another wireless communication network. In addition, the method also enables SRVCC multicall handover from the PS call in one network operation mode to the CS call in another wireless communication network.

20 Claims, 6 Drawing Sheets

(56) References Cited

U.S. PATENT DOCUMENTS

| | | | | |
|---|---|---|---|---|
| 8,170,607 B2* | 5/2012 | Martin | G01S 5/0252 | 370/260 |
| 2005/0250505 A1* | 11/2005 | Rasanen | H04W 76/025 | 455/450 |
| 2006/0094415 A1* | 5/2006 | Veron | H04W 48/02 | 455/419 |
| 2008/0291874 A1* | 11/2008 | Bae | H04W 36/0022 | 370/331 |
| 2009/0225725 A1* | 9/2009 | Zhu | H04W 36/0033 | 370/331 |
| 2009/0265543 A1* | 10/2009 | Khetawat | H04W 12/08 | 713/151 |
| 2009/0268635 A1* | 10/2009 | Gallagher | H04W 8/08 | 370/254 |
| 2009/0274122 A1* | 11/2009 | Wu | H04W 76/064 | 370/331 |
| 2010/0069101 A1* | 3/2010 | Mahdi | H04W 76/02 | 455/466 |
| 2010/0074224 A1* | 3/2010 | Mahdi | H04W 36/0022 | 370/331 |
| 2010/0075679 A1* | 3/2010 | Tenny | H04W 36/0066 | 455/436 |
| 2010/0077459 A1* | 3/2010 | Mahdi | H04W 36/0022 | 726/4 |
| 2010/0093345 A1* | 4/2010 | Verhoef | H04W 48/18 | 455/433 |
| 2010/0142389 A1* | 6/2010 | Imbimbo | H04L 65/80 | 370/252 |
| 2010/0165948 A1* | 7/2010 | Ore | H04W 36/0033 | 370/331 |
| 2010/0182912 A1* | 7/2010 | Hongisto | H04L 12/5695 | 370/242 |
| 2010/0208670 A1* | 8/2010 | Zisimopoulos | H04W 76/021 | 370/329 |
| 2011/0199947 A1* | 8/2011 | Strobl | H04W 76/025 | 370/310 |

* cited by examiner

METHOD OF HANDLING CALL IN HANDOVER IN WIRELESS COMMUNICATION SYSTEM AND WIRELESS COMMUNICATION DEVICE USING THE SAME

CROSS-REFERENCE TO RELATED APPLICATION

This is a continuation application of and claims the priority benefit of U.S. patent application Ser. No. 12/776,436, filed on May 10, 2010, now allowed, which claims priority benefit of U.S. provisional application Ser. No. 61/180,138, filed on May 21, 2009. The entirety of the above-mentioned patent applications is hereby incorporated by reference herein and made a part of this specification.

BACKGROUND OF THE INVENTION

Field of the Invention

The present invention relates to a method of handling at least a call in handover in a wireless communication system and a wireless communication device using the same, and more particularly, to a method of handling at least a packet-switched (PS) call handover to at least a circuit-switched (CS) call in different wireless communication networks and a wireless communication device using the same.

Description of Related Art

Currently, evolved Universal Telephone System Terrestrial Radio Access Network (E-UTRAN) is designed to have only packet-switched (PS) connections, and voice call applications in the E-UTRAN have to be provided in a form of voice over Internet Protocol (VoIP) application or an IP multimedia subsystem (IMS) voice call. However, most operators running the E-UTRAN may still have other types of networks based on other wireless communication technologies, and the operators would like to have a seamless and smooth handover of the VoIP call or the IMS voice call from the E-UTRAN to other networks. For example, one of the operators running the E-UTRAN may have an UTRAN and a Global System for Mobile communications (GSM) Enhanced data rate for GSM evolution radio access network (thereafter abbreviated as GERAN). When a user equipment (UE) with multicall capability has the IMS voice call under one of the PS domain connections in the E-UTRAN and the E-UTRAN initiates a single radio voice call continuity (SRVCC) handover correspondingly, the UE may transfer the IMS voice call to a CS call in either the UTRAN or the GERAN since the CS call has better quality of service (QoS) capabilities such as low latency, low bit error rate, and low timing jitter.

It is currently not clear on whether the UE and the UTRAN (or the GERAN) sets the identical stream identifier (SI) for the CS call. Usually, the UE supporting multicall (i.e. having multicall capability) includes the SI in a SETUP message which is to be sent to the UTRAN or the GERAN. The networks (e.g., the UTRAN or the GERAN) which support multicall may interpret the SI value after receiving the SETUP message from the UE as the following. If the UE generates a new SI value at an initiation of an originating call, then a new traffic channel has to be assigned to the originating call. On the contrary, if the UE just indicates an existing SI value, then the indicated traffic channel has to be used for the originating call. The UE supporting multicall shall never send an additional SETUP with indication that a new traffic channel is requested to a wireless communication network that does not support multicall.

Moreover, if the UE supporting the multicall, the UE has to include the SI information element in the SETUP message. For the first call (i.e., when there is no other ongoing call), the SI may initially start from 1. Usually the SI value may have three bits. However, if the UE does not set the SI value for the CS call but the network sets it to 1, later on when the UE initiates a CS streaming call and the UE sets the SI value to 1 for the CS streaming call, it may cause the streaming CS call setup failed since the UTRAN (or the GERAN) considers the SI=1 already been set for one CS voice call. Beside, the UTRAN or the GERAN cannot use the traffic channel configuration of the CS voice call for the CS streaming call since radio access bearer (RAB) identifier or the traffic channel identifier is required to be identical to the SI. In addition, it is also currently not clear how to handle multicall in handover from the E-UTRAN to either the UTRAN or the GERAN.

Therefore, how to handle calls or multicall in handover in wireless communication systems and related communication devices becomes an important issue to be researched and discussed.

SUMMARY OF THE INVENTION

Accordingly, the present invention proposes a method of handling at least a PS call handover to at least a CS call in different wireless communication networks and a wireless communication device using the same. The method enables a smooth single radio voice call continuity (SRVCC) handover from at least a PS call in one network operation mode to at least a CS call in another network operation mode. In addition, the method also enables a SRVCC multicall handover from at least a PS call in one wireless communication network to at least a CS call in another wireless communication network.

The present invention proposes a method of handling at least a call in handover in a wireless communication system. The wireless communication system includes at least a wireless communication network and a wireless communication device. The method includes the following steps. First, the wireless communication device receives a message for switching at least a PS call to at least a CS call from the wireless communication network. Further, the wireless communication device sets a stream identifier to at least the CS call to an identifier value.

The present invention also proposes the wireless communication device for handling at least a call in handover in the wireless communication system. The wireless communication system. The wireless communication device includes a message receiving module, a stream identifier configuration module, a transceiver module, a memory module, and a processor. The message receiving module receives a message for switching PS calls to CS calls from a wireless communication network. Besides, the stream identifier configuration module sets a stream identifier of each of the CS calls to an identifier value. Further, the transceiver module transmits information to and receives information from the wireless communication network, wherein the information received includes the message for switching the PS calls to the CS calls from the wireless communication network. The memory module stores at least the message for switching the PS calls to the CS calls from the wireless communication network. In addition, the processor executes the message receiving module and the stream identifier configuration module, and controls the transceiver module.

The present invention proposes a method of handling at least a call in handover in a wireless communication system and a wireless communication device for handling at least a call in handover in a wireless communication system. The wireless communication device sets the stream identifier of at least the CS call to the identifier value after receiving a message for switching at least the PS call in one operation mode to at least the CS call in another operation mode, wherein the message is sent from the wireless communication network. The wireless communication network also sets the stream identifier for at least the CS call to the identical identifier value. Therefore, the method may avoid at least the CS call setup failure due to no agreement on the stream identifier for at least the CS call set by the wireless communication device and the wireless communication network. In addition, the method also enables SRVCC multicall handover from at least the PS call in one wireless communication network to at least the CS call in another wireless communication network.

In order to make the features and advantages of the present invention comprehensible, exemplary embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
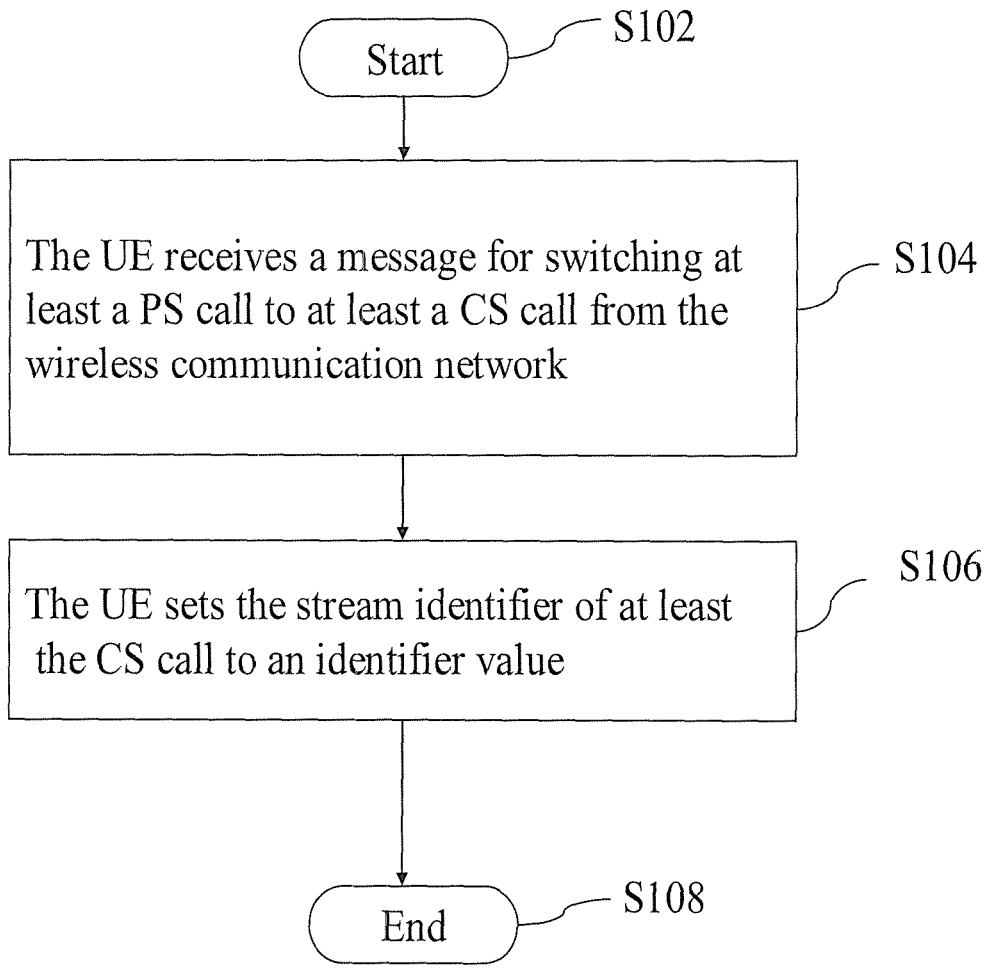
FIG. 1 is a flow diagram illustrating an exemplary process of handling at least a call in handover in a wireless communication system according to a first exemplary embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention proposes a method of handling call(s) in handover in a wireless communication system. The wireless communication system includes at least a wireless communication network and a wireless communication device. The method includes the following steps. First, the wireless communication device receives a message for switching the packet-switched (PS) call(s) to the circuit-switched (CS) call(s) from the wireless communication network. Further, the wireless communication device sets a stream identifier of each of the CS calls to an identifier value.

The present invention also proposes the wireless communication device for handling at least a call in handover in a wireless communication system. The wireless communication device includes a message receiving module, a stream identifier configuration module, a transceiver module, a memory module, and a processor. The message receiving module receives the message for switching PS calls to CS calls from the wireless communication network. Besides, the stream identifier configuration module sets the stream identifier of each of the CS calls to the identifier value. Further, the transceiver module transmits information to and receives information from the wireless communication network, wherein the information received includes the message for switching the PS calls to the CS calls from the wireless communication network. The memory module stores at least the message for switching the PS calls to the CS calls from the wireless communication network. In addition, the processor executes the message receiving module and the stream identifier configuration module, and controls the transceiver module.

In all exemplary embodiments of the present invention, the wireless communication system includes at least the wireless communication network and the wireless communication device. The wireless communication network may include more than one operation modes, or may include more than two sub-networks. For example, the wireless communication network may include a Universal Mobile Telephone System Terrestrial Radio Access Network (UTRAN), an evolved UTRAN (E-UTRAN), and a Global System for Mobile communications (GSM) Enhanced data rate for GSM evolution radio access network (thereafter abbreviated as GERAN). Similarly, the wireless communication device may also have capability to transmit information to and receive information from the UTRAN, the E-UTRAN, and the GERAN. The above-described wireless communication system is not intended to limit the present invention, and the wireless communication system may include more than one wireless communication network and more than one wireless communication device.

In a case of one exemplary embodiment of the present invention where the wireless communication network is integrated by different independent networks (e.g., the UTRAN, the E-UTRAN, and the GERAN), the wireless communication device is capable of moving around in these independent networks but may have to handover the PS call or handover the PS calls established previously from one network (e.g., the E-UTRAN) to the CS calls in another sub-network (e.g., the UTRAN). Further, the wireless communication device may have multicall capability, which means that: the wireless communication device supports simultaneously at least two CS calls. In addition, it is to be noted that the PS calls may be adapted for single radio voice call continuity (SRVCC).

FIG. 1 is a flow diagram illustrating an exemplary process 100 of handling at least a call in handover in a wireless communication system according to a first exemplary embodiment of the present invention. Referring to FIG. 1, in the first exemplary embodiment of the present invention, prior to process block S102, the wireless communication device (for a purpose of simplicity, hereinafter referred as UE) is assumed to have multicall capability and has established at least the PS call in the wireless communication network. However, due to some reasons, the wireless communication network initiates a message for switching at least a PS call from one network (e.g., the E-UTRAN) to at least a CS call in another sub-network (e.g., the UTRAN). Some reasons mentioned above, are such as network capacity limitations, poor signal-to-noise ratio (SNR), poor signal strength level, and so on. The process 100 starts at the process block S102. After the process block S102, the process 100 may transit to process block S104.

At the process block S104, the UE receives the message for switching at least a PS call to at least a CS call from the wireless communication network. It should be noted that the message for switching at least the PS call to at least the CS call from the wireless communication network is a handover command. Besides, the handover command may be a handover to UTRAN command, and a radio access bearer (RAB) identifier of a CS RAB is included in the handover to UTRAN command for the CS call. Further, the handover command may be a handover to GERAN command, and a RAB identifier of the CS RAB is included in the handover to GERAN command for the CS call. After the process block S104, the process 100 may transit to process block S106.

At the process block S106, the UE sets a stream identifier of at least the CS call to an identifier value. Correspondingly, the wireless communication network sets the stream identifier, stored at the wireless communication network, of at least the CS call to the identical identifier value as set by the UE. It is noted that, in the following exemplary embodiments, the identifier value is the radio access bearer (RAB) identifier of a CS RAB included in the handover to UTRAN command for the CS call, the radio access bearer (RAB) identifier of a CS RAB included in the handover to GERAN command for at least the CS call, or a default value. The default value may be equal to 1, but the value of the default value is not used to limit the present invention.

After the process block S106, the process 100 may transit to process block S108. At the process block S108, the process 100 terminates. Furthermore, when at least the PS call comprises a plurality of PS calls, and at least the CS call comprises a plurality of CS calls, the UE sets stream identifiers of the CS calls to identifier values respectively at the process block S106. Correspondingly, the wireless communication network sets the stream identifiers, stored at the wireless communication network, of the CS calls to the identical identifier values as set by the UE.

Alternatively, the process 100 may be repeated periodically, in a continuous fashion, or upon being triggered as a result of a condition, such as a poor SNR situation detected by the UE. In addition, the process blocks S102-S108 may be repeated periodically, in a continuous fashion, or upon being triggered as a result of a condition, without repeating the entire process 100. For example, the process blocks S102-S108 may be repeated a number of times in response to impetuses in which the poor SNR situation is detected by the UE. Other combinations and permutations are possible as well.

Figure 2:
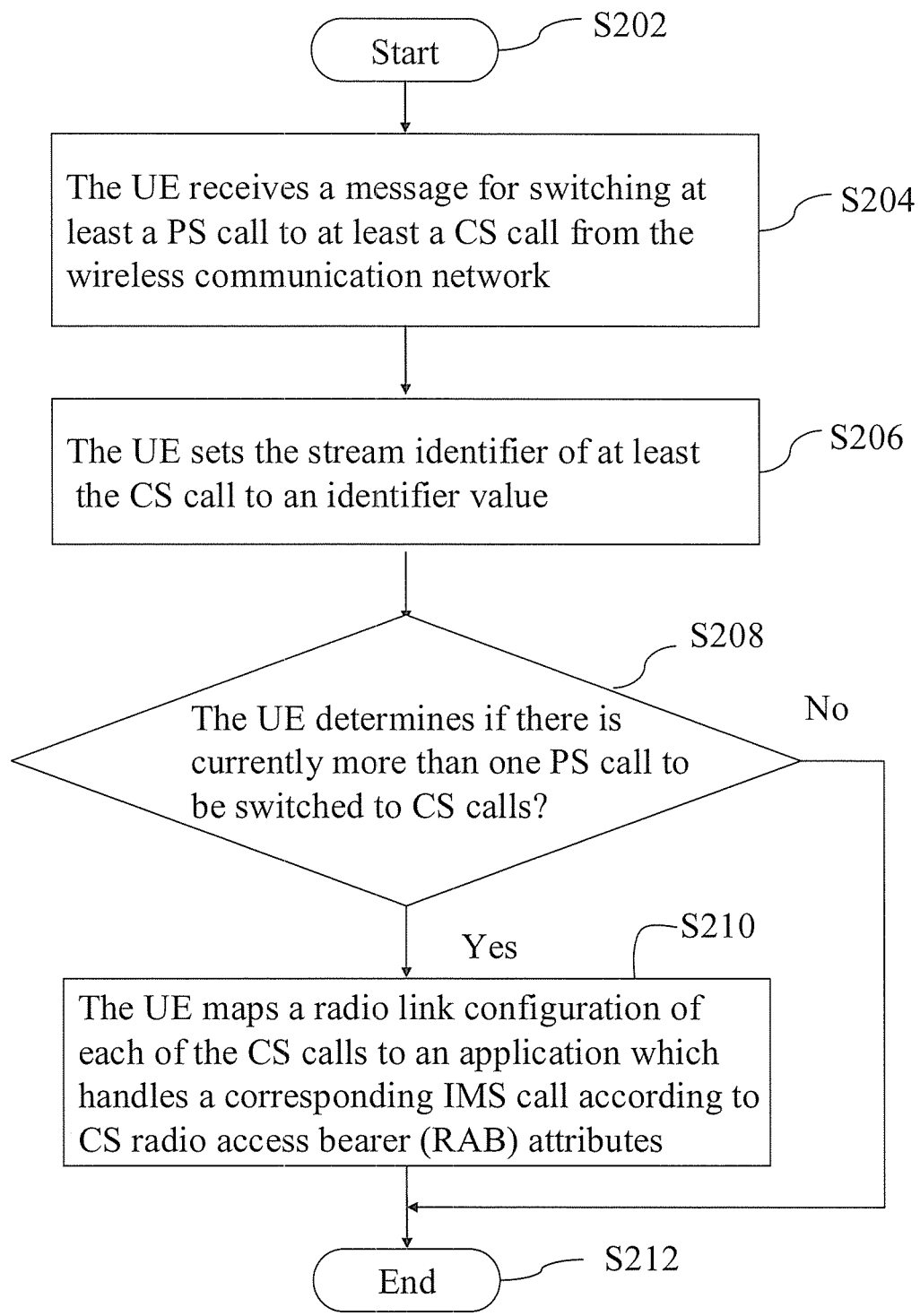
FIG. 2 is a flow diagram illustrating an exemplary process of handling at least a call in handover in a wireless communication system according to a second exemplary embodiment of the present invention.

FIG. 2 is a flow diagram illustrating an exemplary process 200 of handling at least a call in handover in a wireless communication system according to a second exemplary embodiment of the present invention. Referring to FIG. 2, in the second exemplary embodiment of the present invention, the UE has established at least a PS call, such as an IP multimedia subsystem (IMS) call, in the wireless communication network prior to process block S202. The IMS call, for example, may be an instant message, a video call, a voice call, any other session initial protocol (SIP) based calls, or any other Session Initiation Protocol based (SIP-based) communication applications. In particular, the voice call of the IMS call may be a voice over Internet protocol (VoIP) call. In addition, the process 200 is similar to the process 100 of FIG. 1, and the process blocks S204-S214 are described herein below.

At the process block S204, the UE receives the message for switching at least a PS call to at least a CS call from the wireless communication network. The message for switching at least the PS call to at least the CS call from the wireless communication network is the handover command and includes the identifier value and the radio link configuration for at least the CS call. When the wireless communication device currently has more than one PS calls to be switched to the CS calls, the message for switching the PS calls to the CS calls from the wireless communication network is the handover command and includes the identifier values and the radio link configurations respectively for the CS calls. Besides, the handover command may be the handover to UTRAN command, and the identifier value is the RAB identifier of the CS RAB included in the handover to UTRAN command for the CS call. Further, the handover command may be the handover to GERAN command, and the identifier value is the RAB identifier of the CS RAB included in the handover to GERAN command for the CS call. After the process block S204, the process 200 may transit to process block S206.

At the process block S206, the UE sets a stream identifier of at least the CS call to an identifier value. Correspondingly, the wireless communication network sets the stream identifier, stored at the wireless communication network, of at least the CS call to the identical identifier value as set by the UE. It is noted that, the identifier value is the radio access bearer (RAB) identifier of a CS RAB included in the handover to UTRAN command for the CS call, or the radio access bearer (RAB) identifier of a CS RAB included in the handover to GERAN command for at least the CS call.

After process block S206, the process 200 may transit to process block S208. At the process block S208, the UE determines if there is currently more than one PS calls to be switched to CS calls. If yes, then after the process block S208, the process 200 may transit to process block S210. If no, then after the process block S208, the process 200 may transit to process block S212.

At the process block S210, the UE maps a radio link configuration of each of the CS calls to an application which handles a corresponding IMS call according to CS radio access bearer (RAB) attributes. The application handling the IMS call, for example, may be an instant message application, a video call application, a voice call application, or any other SIP-based communication applications. In particular, the application handling the IMS call may be a VoIP call application. Besides, the message for switching the PS calls to the CS calls from the wireless communication network includes the identifier value and the radio link configuration for each of the CS calls. The UE may further determine a type of the application handling the corresponding IMS call according to radio link configuration of the PS calls. For example, if the data rate included in the radio link configuration is high, the application handling the corresponding IMS call may be determined as the streaming application. On the other hand, if the data rate included in the radio link configuration is low, the application handling the corresponding IMS call may be determined as the voice call application or the VoIP call application. Moreover, it should be noted that if the handover command is determined as the handover to GERAN command in the process block S204, then there is only one PS call to be switched to the CS call, and usually the PS call with a preset highest priority is switched to the CS call while the remaining PS calls (if they exist) would be discarded or handover to PS domains. Further, in such a case, the UE just maps a radio link configuration of the CS call to the application which handles a corresponding IMS call according to CS radio access bearer (RAB) attributes.

In the other exemplary embodiment, another manner to map a radio link configuration of each of the CS calls to an application which handles a corresponding IMS call according to CS radio access bearer (RAB) attributes in the process block S110 is illustrated below. The UE determines a CS RAB is a voice call or a data call according to a CS RAB configuration. Based upon the foregoing example, the UE may determine whether the CS RAB is a CS adaptive multi-rate (AMR) narrowband (NB) voice call or a CS AMR wideband (WB) voice call according to a data rate of the CS RAB. For another example, the UE may also determine whether the CS RAB is the CS AMR NB voice call or a CS AMR WB voice call according to a number of radio bearers (RBs) included in the CS RAB when the CS RAB is determined for a voice call. For example, if one of the CS RAB includes three RBs, then the CS RAB may be determined as for the CS AMR NB voice call. For another example, if another CS RAB includes two RBs, then the CS RAB may be determined as for the CS AMR WB voice call. However, the present invention is not limited to the above-described examples, other exemplary embodiments of the present invention may determine whether the CS RAB is the CS AMR NB voice call or a CS AMR WB voice call according to other parameters. Further, the UE may also determine the CS RAB is for a data call if the number of RB included in the CS RAB is 1. Moreover, the UE determines the data rate of the CS RAB according to the CS RAB configuration. If the handover command is determined as the handover to GERAN command in the process block S204, the UE determines whether the CS RAB is a CS full rate (FR) voice call, a CS half rate (HR) voice call, a CS enhanced full rate (EFR) voice call, or a CS AMR NB voice call according the data rate of the CS RAB. After the process block S210, the process 200 may transit to process block S212. At the process block S212, the process 200 terminates. Alternatively, the process 200 may be repeated periodically, in a continuous fashion, or upon being triggered as a result of a condition, such as the poor SNR situation detected by the UE.

In addition, the process blocks S202-S212 may be repeated periodically, in a continuous fashion, or upon being triggered as a result of a condition, without repeating the entire process 200. For example, the process blocks S202-S212 may be repeated a number of times in response to impetuses in which the poor SNR situation is detected by the UE. Other combinations and permutations are possible as well.

Figure 3:
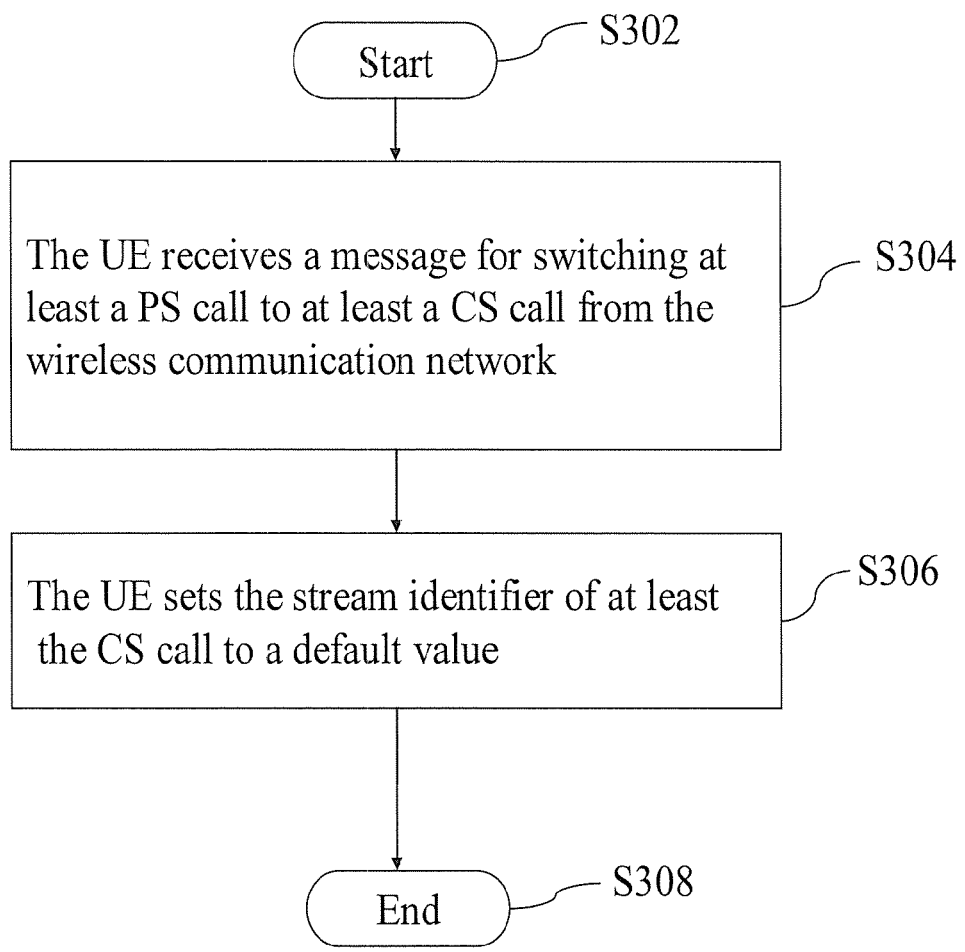
FIG. 3 is a flow diagram illustrating an exemplary process of handling at least a call in handover in a wireless communication system according to a third exemplary embodiment of the present invention.

FIG. 3 is a flow diagram illustrating an exemplary process 300 of handling at least a call in handover in a wireless communication system according to a third exemplary embodiment of the present invention. Referring to FIG. 3, in the third exemplary embodiment of the present invention, the process 300 is similar to the process 100 of FIG. 1, and the process blocks S304 and S306 are described below. The process 300 starts from the process block S302 and then transit to process block S304.

At the process block S304, the UE receives the message for switching at least a PS call, such as an IMS call, to at least a CS call from the wireless communication network. It should be noted that the message for switching at least the PS call to at least the CS call from the wireless communication network is a handover command. Besides, the handover command may be a handover to UTRAN command, and a radio access bearer (RAB) identifier of a CS RAB is included in the handover to UTRAN command for the CS call. Further, the handover command may be a handover to GERAN command, and a RAB identifier of the CS RAB is included in the handover to GERAN command for the CS call.

After process block S304, the process 300 may transit to process block S306. At the process block S306, the UE sets the stream identifier of at least the CS call to a default value. In other words, in the third exemplary embodiment of the present invention, the identifier value is the default value. Besides, the default value is 1 in the third exemplary embodiment of the present invention. However, the present invention is not limited to the above-described example; other exemplary embodiments of the present invention may set the default value to a figure other than 1. After the process block S306, the process 300 may transit to process block S308. At the process block S308, the process 300 terminates. Alternatively, the process 300 may be repeated periodically, in a continuous fashion, or upon being triggered as a result of a condition, such as the poor SNR situation detected by the UE.

In addition, the process blocks S302-S308 may be repeated periodically, in continuous fashion, or upon being triggered as a result of a condition, without repeating the entire process 300. For example, the process blocks S302-S308 may be repeated a number of times in response to impetuses in which the poor SNR situation is detected by the UE. Other combinations and permutations are possible as well.

Figure 4:
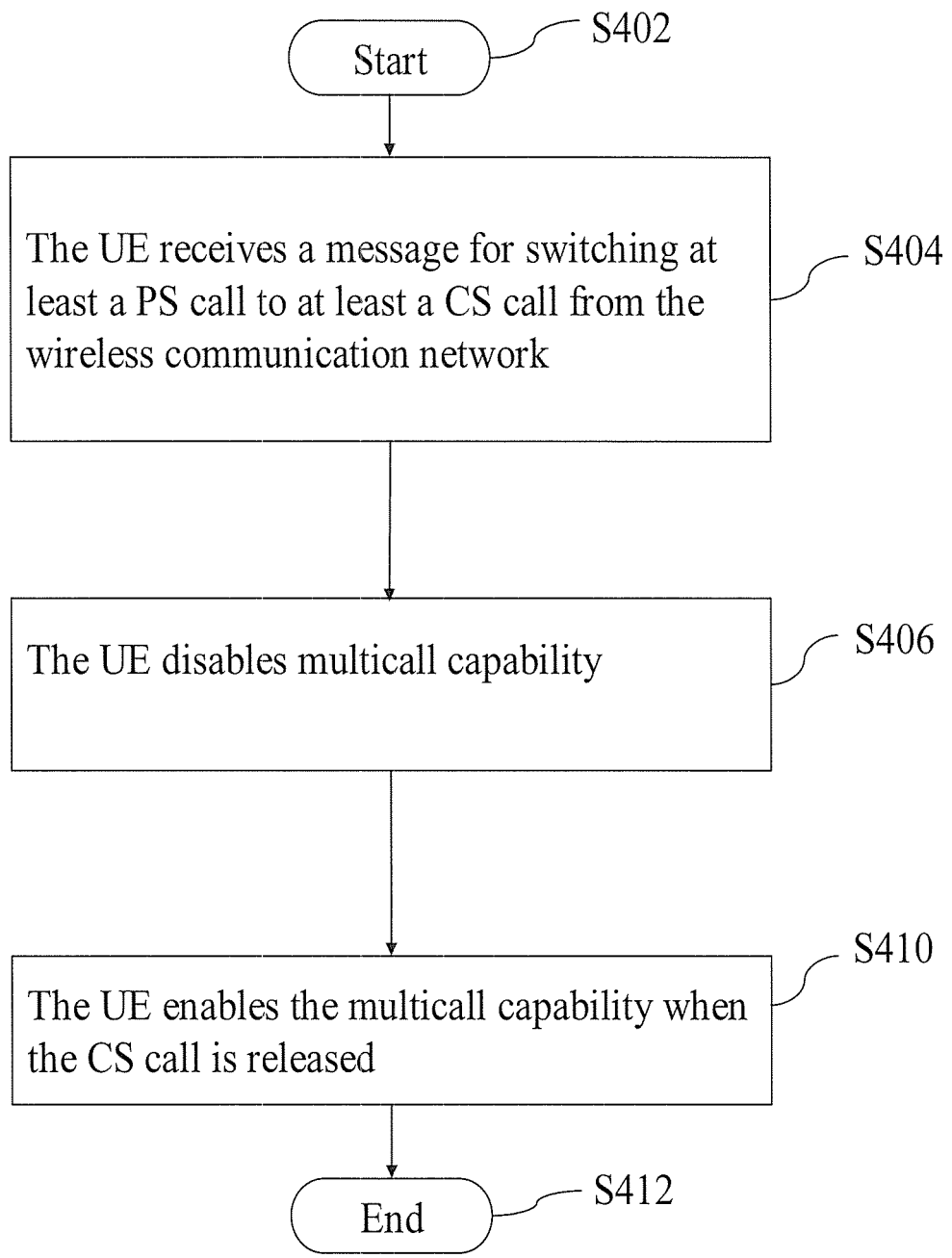
FIG. 4 is a flow diagram illustrating an exemplary process of handling at least a call in handover in a wireless communication system according to a fourth exemplary embodiment of the present invention.

FIG. 4 is a flow diagram illustrating an exemplary process 400 of handling at least a call in handover n a wireless communication system according to a fourth exemplary embodiment of the present invention. Referring to FIG. 4, in the fourth exemplary embodiment of the present invention, the process 400 is similar to the process 100 of FIG. 1, and the process 400 is described below. The process 400 starts from the process block S402, and then transits to process block S404.

At the process block S404, the UE receives the message for switching at least a PS call to at least a CS call from the wireless communication network. It should be noted that the message for switching at least the PS call to at least the CS call from the wireless communication network is a handover command. Besides, the handover command may be a handover to UTRAN command, and a radio access bearer (RAB) identifier of a CS RAB is included in the handover to UTRAN command for the CS call. Further, the handover command may be a handover to GERAN command, and a RAB identifier of the CS RAB is included in the handover to GERAN command for the CS call.

After process block S404, the process 400 may transit to process block S406. At the process block S406, the UE disables the multicall capability. Since the multicall capability is disabled in the fourth exemplary embodiment, if there are more than one PS calls to be switched to the CS calls, then just one of the PS calls is switched to the CS call. Usually the PS call with a preset highest priority is switched to the CS call while the remaining PS calls (if they exist) would be discarded. After the process block S406, the process 400 may transit to process block S410.

After the process block S406, the process 400 may transit to process block S410. At the process block S410, the UE enables the multicall capability when the CS call is released. After the process block S410, the process may transit to the process block S412. At the process block S412, the process 400 terminates. Alternatively, the process 400 may be repeated periodically, in a continuous fashion, or upon being triggered as a result of a condition, such as the poor SNR situation detected by the UE.

In addition, the process blocks S402-S412 may be repeated periodically, in a continuous fashion, or upon being triggered as a result of a condition, without repeating the entire process 400. For example, the process blocks S402-S412 may be repeated a number of times in response to impetuses in which the poor SNR situation is detected by the UE. Other combinations and permutations are possible as well.

Figure 5:
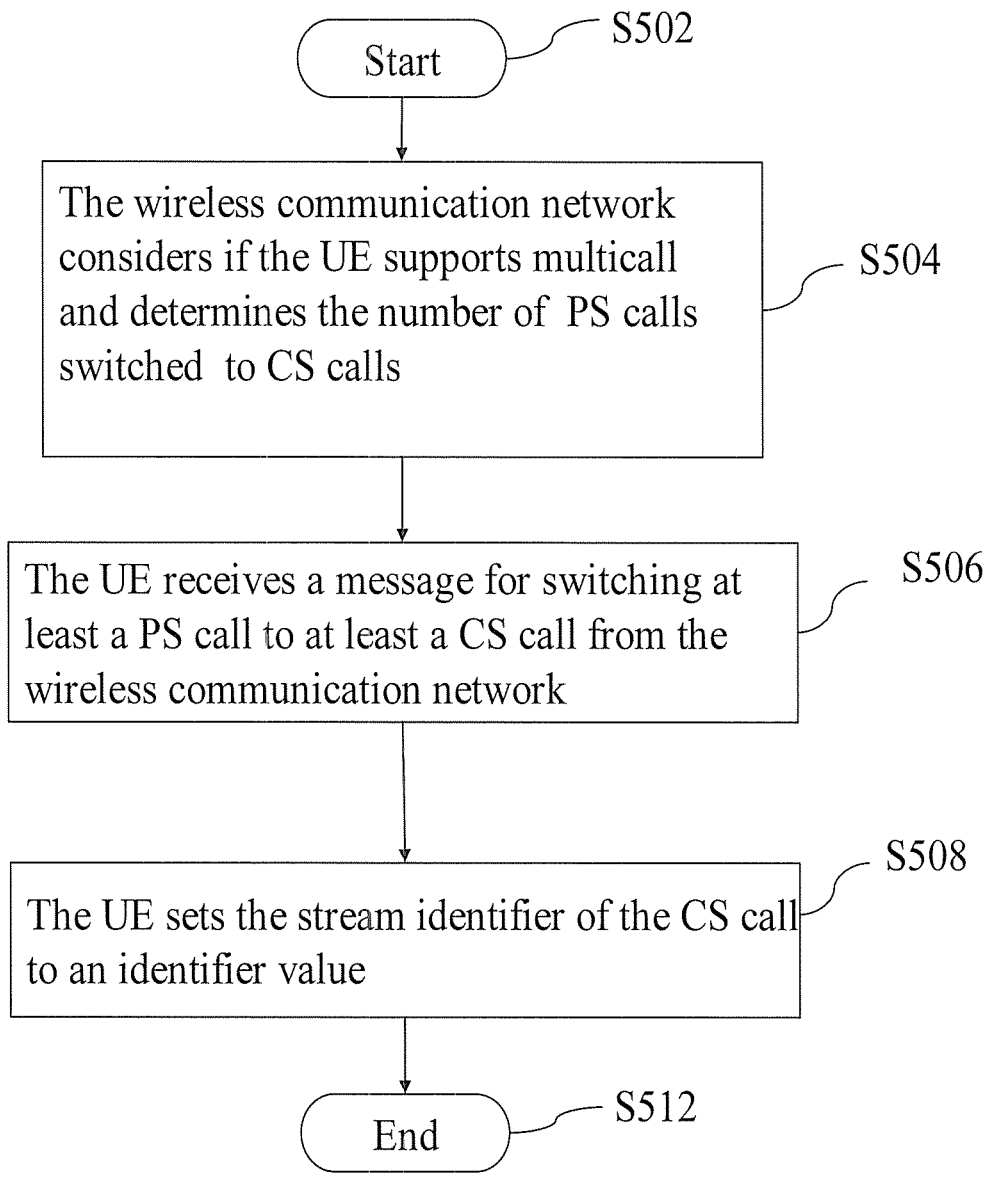
FIG. 5 is a flow diagram illustrating an exemplary process of handling at least a call in handover in a wireless communication system according to a fifth exemplary embodiment of the present invention.

FIG. 5 is a flow diagram illustrating an exemplary process 500 of handling at least a call in handover in a wireless communication system according to a fifth exemplary embodiment of the present invention. Referring to FIG. 5, in the fifth exemplary embodiment of the present invention, the process 500 is similar to the process 100 of FIG. 1 and the process 400 of FIG. 4, and the process 500 is described below. The process 500 starts from the process block S502, and then transits to process block S504.

At the process block S504, the wireless communication network considers if the UE supports multicall and determines the number of PS calls to be switched to CS calls. Assuming the wireless communication network is not aware of whether the UE has the multicall capability prior to the process 500 starts, so the wireless communication network first determines if the UE has the multicall capability. After the process block S506, the process 500 may transit to process block S506.

At the process block S504, the UE receives the message for switching at least a PS call to at least a CS call from the wireless communication network. It should be noted that the message for switching at least the PS call to at least the CS call from the wireless communication network is a handover command. Besides, the handover command may be a handover to UTRAN command, and a radio access bearer (RAB) identifier of a CS RAB is included in the handover to UTRAN command for the CS call. Further, the handover command may be a handover to GERAN command, and a RAB identifier of the CS RAB is included in the handover to GERAN command for the CS call. At least the PS call and at least the CS call may be one PS call and one CS call, when the network determines the UE does not have multicall capability. By contrast, at least the PS call and at least the CS call may comprise PS calls and CS calls respectively, when the network determines the UE has the multicall capability and one more than PS calls are to be switched to more than one CS calls.

At the process block S508, if the UE is determined to have the multicall capability, the UE sets the stream identifier of at least the CS calls to the identifier value. Correspondingly, the wireless communication network sets the stream identifier, stored at the wireless communication network, of at least the CS call to the identical identifier value as set by the UE. On the contrary, if the UE is determined to have no multicall capability, the UE switches just one of the PS calls to the CS call when the UE does not support multicall. Usually the PS call with the preset highest priority is switched to the PS call while the remaining PS calls (if they exist) would be discarded or handover to PS domains. After the process block S508, the process 500 may transit to process block S510. At the process block S510, the process 500 terminates. Alternatively, the process 500 may be repeated periodically, in a continuous fashion, or upon being triggered as a result of a condition, such as the poor SNR situation detected by the UE.

In addition, the process blocks S502-S510 may be repeated periodically, in a continuous fashion, or upon being triggered as a result of a condition, without repeating the entire process 500. For example, the process blocks S502-S510 may be repeated a number of times in response to impetuses in which the poor SNR situation is detected by the UE. Other combinations and permutations are possible as well.

The present invention also proposes a wireless communication device using the method of handling at least a call in handover in a wireless communication system. The wireless communication device is described in details below.

Figure 6:
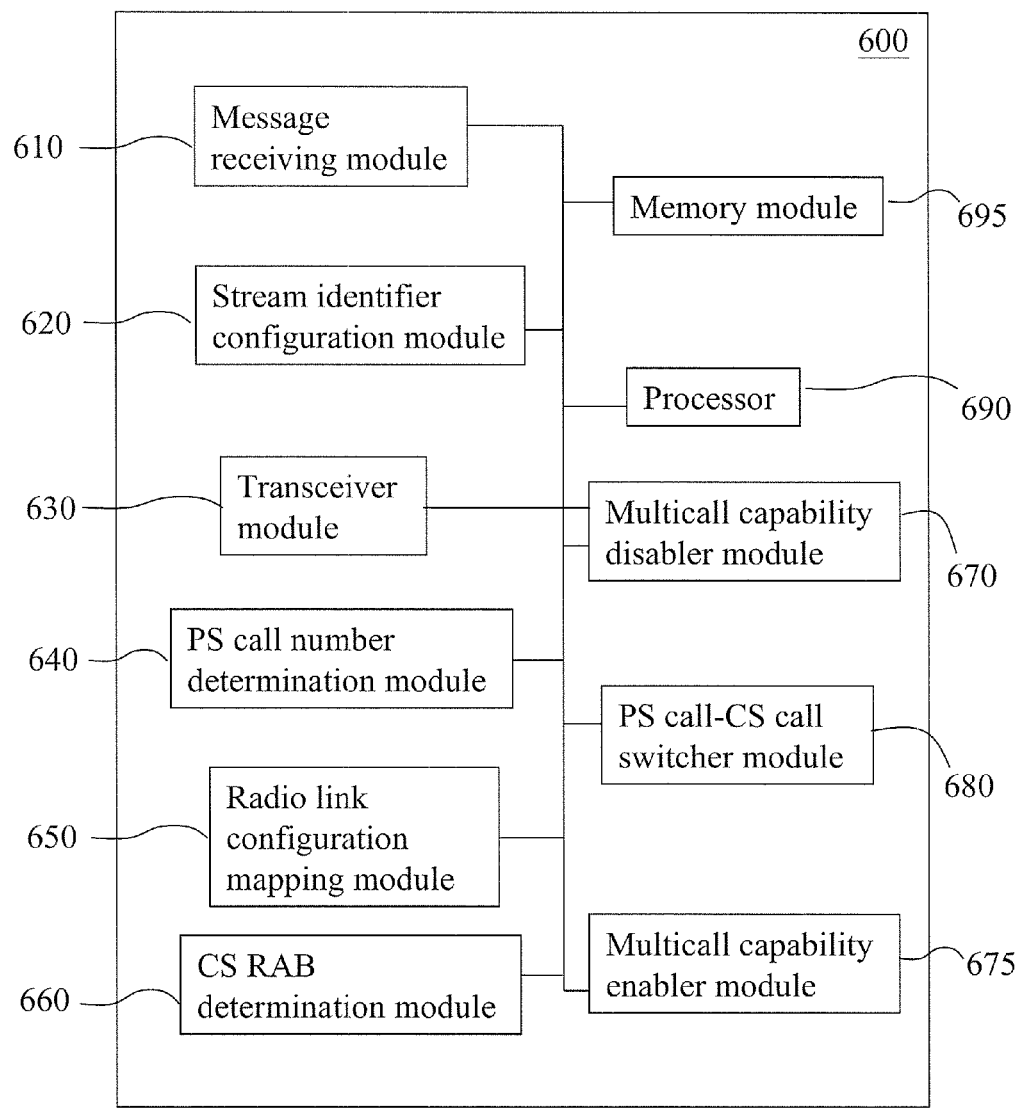
FIG. 6 is a schematic block diagram illustrating a structure of a wireless communication device for handling at least a call in handover in a wireless communication system according to a sixth exemplary embodiment of the present invention.

FIG. 6 is a schematic block diagram illustrating a structure of a wireless to communication device 600 for handling at least a call in handover in a wireless communication system according to a sixth exemplary embodiment of the present invention. Referring to FIG. 6, the wireless communication device 600 includes a message receiver module 610, a stream identifier configuration module 620, a transceiver module 630, a PS call number determination module 640, a radio link configuration mapping module 650, a CS RAB determination module 660, a multicall capability disabler module 670, a multicall capability enabler module 675, and a PS call-CS call switcher module 680, a processor 690, and a memory module 695.

The message receiver module 610 receives the message for switching at least a PS call to at least a CS call from the wireless communication network. Besides, the stream identifier configuration module 620 sets the stream identifier of at least the CS call to the identifier value. Moreover, the transceiver module 630 transmits the information to and receives the information from the wireless communication network, wherein the information received includes the message for switching at least the PS call to at least the CS call from the wireless communication network.

The PS call number determination module 640 determines whether the wireless communication device currently has more than one PS calls to be switched to the CS calls. Besides, the radio link configuration mapping module 650 maps the radio link configuration of each of the CS call to the application handling corresponding the IMS call according to the CS RAB attributes if the wireless communication device is determined as currently having more than one PS calls to be switched to the CS calls.

The CS RAB determination module 660 determines whether the CS RAB is for the voice call or for the data call according to the CS RAB configuration.

The multicall capability disabler module 670 disables the multicall capability of the wireless communication device. On the contrary, the multicall capability enabler module 675 enables the multicall capability of the wireless communication device when the wireless communication device releases the CS call.

The PS call-CS call switcher module 680 switches at least the PS call to at least the CS call. More specifically, the PS call-CS call switcher module 680 switches at least the PS call originally in one network (e.g, the E-UTRAN) to at least the CS call in another network (e.g., the UTRAN and the GERAN).

The memory module 695 stores software programs or software modules related to the message receiver module 610, the stream identifier configuration module 620, the transceiver module 630, the PS call number determination module 640, the radio link configuration mapping module 650, the CS RAB determination module 660, the multicall capability disabler module 670, the multicall capability enabler module 675, and the PS call-CS call switcher module 680 and at least the message for switching at least the PS call to at least the CS call from the wireless communication network. Besides, the memory module 695 may be one or more memory devices, adapted for storing data and software programs. For example, the memory module 695 may be a RAM, a ROM, a magnetic storage device, a flash memory storage device, or an optical storage device.

The processor 690 executes the message receiver module 610, the stream identifier configuration module 620, the PS call number determination module 640, the radio link configuration mapping module 650, the CS RAB determination module 660, the multicall capability disabler module 670, the multicall capability enabler module 675, and the PS call-CS call switcher module 680 and controlling the transceiver module 630. In addition, the processor 690 may execute other software applications or software modules stored on the memory module 695.

The wireless communication device 600 may transmit information to and receive information from the wireless communication network (e.g., the E-UTRAN, the UTRAN, and the GERAN) and may apply any of the above-described exemplary processes for handling at least a call in handover in the wireless communication system according to the exemplary embodiments mentioned previously.

The above-described exemplary embodiments of the present invention may also be embodied as computer-readable codes on a computer-readable recording medium. The computer-readable recording medium is any data storage device that may store data, which may thereafter be read by a computer system. Examples of the computer-readable recording medium include, but are not limited to, Read-Only Memory (ROM), Random-Access Memory (RAM), CD-ROMs, magnetic tapes, floppy disks, flash memory, optical data storage devices, and carrier waves (such as data transmission through the Internet via wired or wireless transmission paths). The computer-readable recording medium may also be distributed over network-coupled computer systems so that the computer-readable code is stored and executed in a distributed fashion. Also, function programs, codes, and code segments for accomplishing the present invention may be easily construed as within the scope of the invention by programmers skilled in the art to which the present invention pertains.

In summary, the embodiments of the present invention proposes the method of handling at least a call in handover in the wireless communication systems and the wireless communication device for handling at least a call in handover in a wireless communication system. The wireless communication device sets the stream identifier of at least the CS call to the identifier value after receiving the message for switching at least a PS call in one wireless communication network to at least a CS call in another wireless communication network, wherein the message is sent from the wireless communication network. The wireless communication network may also set the stream identifier for at least the CS call to the identical identifier value correspondingly. Therefore, the method may avoid at least the CS call setup failure due to no agreement on the stream identifier for at least the CS call. In addition, the method also enables SRVCC multicall handover from at least the PS call in one wireless communication network to at least the CS call in another wireless communication network.

Although the present invention has been disclosed above by the exemplary embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A method of handling at least a call in handover in a wireless communication system, wherein the wireless communication system comprising at least a wireless communication network and a wireless communication device, the method comprising:
    receiving a message at the wireless communication device from the wireless communication network which transmits the message to initiate a single radio voice call continuity (SRVCC) handover for switching at least a packet-switched (PS) call to at least a CS call, wherein the wireless communication device is a user equipment (UE) with multicall capability of supporting simultaneously at least two circuit-switched (CS) calls; and
    disabling, at the wireless communication device, the multicall capability in response to receiving the message for initiating the SRVCC handover, to switch one of the at least a PS call with a preset highest priority to the CS call and discard the other of the at least a PS call.

2. The method claimed in claim 1, further comprising:
    setting, at the wireless communication device, a stream identifier of the CS call to an identifier value in response to receiving the message for initiating the SRVCC handover.

3. The method as claimed in claim 2, wherein the identifier value is a default value.

4. The method as claimed in claim 2, wherein the wireless communication network further sets a stream identifier of the CS call to the identifier value in response to transmitting the message for initiating the SRVCC handover.

5. The method as claimed in claim 2, wherein the message is a handover to Universal Mobile Telephone System Terrestrial Radio Access Network (UTRAN) command, and the identifier value is a radio access bearer (RAB) identifier of a CS RAB included in the handover to UTRAN command for the CS call.

6. The method as claimed in claim 5, wherein the wireless communication device determines whether the CS RAB is for a CS adaptive multi-rate (AMR) narrowband (NB) voice call or for a CS AMR wideband (WB) voice call according to a number of radio bearers (RBs) included in the CS RAB when the CS RAB is determined for a voice call.

7. The method as claimed in claim 2, wherein the message is a handover to GSM EDGE Radio Access Network (GERAN) command, and the identifier value is a RAB identifier of a CS RAB included in the handover to GERAN command for the CS call.

8. The method as claimed in claim 7, wherein the wireless communication device further determines whether the CS RAB is for a CS full rate (FR) voice call, for a CS half rate (HR) voice call, for a CS enhanced full rate (EFR) voice call, or for a CS AMR adaptive multi-rate (AMR) narrowband (NB) voice call according to a data rate of the CS RAB.

9. The method as claimed in claim 1, further comprising:
enabling, at the wireless communication device, the multicall capability when the wireless communication device releases the CS call.

10. A wireless communication device, the wireless communication device comprising:
a message receiver, configured for receiving a message from a wireless communication network which transmits the message to initiate a single radio voice call continuity (SRVCC) handover for switching at least a packet-switched (PS) call to at least a CS call, wherein the wireless communication device is a user equipment (UE) with multicall capability of supporting simultaneously at least two circuit-switched (CS) calls; and
a multicall capability disabler, configured for disabling the multicall capability in response to receiving the message for initiating the SRVCC handover to switch one of the at least a PS call with a preset highest priority to the CS call, and discarding the other of the at least a PS call.

11. The wireless communication device claimed in claim 10, further comprising:
a stream identifier configuration module, configured for setting a stream identifier of the CS call to an identifier value in response to receiving the message for initiating the SRVCC handover.

12. The wireless communication device as claimed in claim 11, wherein the wireless communication network further sets a stream identifier of the CS call to the identifier value in response to transmitting the message for initiating the SRVCC handover.

13. The wireless communication device as claimed in claim 11, wherein the message is a handover to Universal Mobile Telephone System Terrestrial Radio Access Network (UTRAN) command, and the identifier value is a radio access bearer (RAB) identifier of a CS RAB included in the handover to UTRAN command for the CS call.

14. The wireless communication device as claimed in claim 13, wherein the wireless communication device determines whether the CS RAB is for a CS adaptive multi-rate (AMR) narrowband (NB) voice call or for a CS AMR wideband (WB) voice call according to a number of radio bearers (RBs) included in the CS RAB when the CS RAB is determined for a voice call.

15. The wireless communication device as claimed in claim 11, wherein the message is a handover to GSM EDGE Radio Access Network (GERAN) command, and the identifier value is a RAB identifier of a CS RAB included in the handover to GERAN command for the CS call.

16. The wireless communication device as claimed in claim 15, wherein the wireless communication device further determines whether the CS RAB is for a CS full rate (FR) voice call, for a CS half rate (HR) voice call, for a CS enhanced full rate (EFR) voice call, or for a CS AMR adaptive multi-rate (AMR) narrowband (NB) voice call according to a data rate of the CS RAB.

17. The wireless communication device as claimed in claim 10, further comprising:
a multicall capability enabler, configured for enabling the multicall capability when the wireless communication device releases the CS call.

18. A method of handling at least a call in handover in a wireless communication system, wherein the wireless communication system comprises at least a wireless communication network a wireless communication device, the method comprising:
receiving a message at the wireless communication device from the wireless communication network which transmits the message to initiate a single radio voice call continuity (SRVCC) handover for switching at least a packet-switched (PS) call to at least a circuit-switched (CS) call, wherein the wireless communication device is a user equipment (UE) having a multicall capability and is capable of supporting at least two circuit-switched (CS) calls;
disabling, at the wireless communication device, the multicall capability, to switch one of the at least a PS call with a preset highest priority to the CS call and discard the other of the at least a PS call; and
enabling, at the wireless communication device, the multicall capability when the wireless communication device releases the CS call.

19. The method as claimed in claim 18, further comprising:
setting, by the wireless communication device, a UE stream identifier of the CS call to an identifier value in response to receiving the message for initiating the SRVCC handover.

20. The method as claimed in claim 18, further comprising:
setting, by the wireless communication network, a network stream identifier of the CS call to the identifier value in response to transmitting the message for initiating the SRVCC handover.

* * * * *